United States Patent
Aselman, Jr.

[11] 3,709,030
[45] Jan. 9, 1973

[54] VIBRATION DETECTION APPARATUS

[75] Inventor: Edward C. Aselman, Jr., High Ridge, Mo.

[73] Assignee: TNE Incorporated, High Ridge, Mo.

[22] Filed: May 27, 1970

[21] Appl. No.: 40,789

Related U.S. Application Data

[63] Continuation-in-part of Ser. No. 684,768, Nov. 21, 1967, abandoned.

[52] U.S. Cl.................................73/71.1, 340/261
[51] Int. Cl...............................................G01h 1/00
[58] Field of Search............73/71.1, 71.2, 71.3, 71.4, 73/69, 70.1, 70.2; 250/231, 232; 340/261

[56] References Cited

UNITED STATES PATENTS

| | | | |
|---|---|---|---|
| 2,958,786 | 11/1960 | Millis | 250/232 |
| 3,040,586 | 6/1962 | Staff | 73/71.2 X |
| 3,159,024 | 12/1964 | Tsien | 73/71.3 |
| 3,201,776 | 8/1965 | Morrow et al. | 73/71.4 X |
| 3,252,001 | 5/1966 | Thompson et al. | 73/71.4 UX |
| 3,435,289 | 3/1969 | Aselman, Jr. | 317/13 |

*Primary Examiner*—Richard C. Queisser
*Assistant Examiner*—John P. Beauchamp
*Attorney*—Koenig, Senniger, Powers and Leavitt

[57] ABSTRACT

Vibration responsive apparatus including novel vibration sensing means. The vibration sensing means includes a light source, a light-sensitive element positioned for receiving light from the light source and producing changes in electron flow in response to changes in the incidence of light thereon, and a movable member supported for oscillatory movement in response to vibration to cause changes in the incidence of light on the element to an extent dependent upon the magnitude of the vibration. Circuit means produces a first signal in response to said changes in electron flow, the signal amplitude varying with the magnitude of vibration. Voltage comparing means algebraically compares the magnitude of the pulsating signal with a preselected reference potential and delivers an output signal when the algebraic sum of the magnitude of the pulsating signal and the reference potential crosses a predetermined threshold voltage. Control means is operative in response to an output signal from the voltage comparing means to perform a control function at a preselected magnitude of vibration.

22 Claims, 14 Drawing Figures

PATENTED JAN 9 1973

INVENTOR
EDWARD C. ASELMAN, JR.
BY
Robert J. Schaap
ATTORNEY

PATENTED JAN 9 1973

INVENTOR
EDWARD C. ASELMAN, JR.

BY
*Robert J. Schaap*

ATTORNEY

VIBRATION DETECTION APPARATUS

CROSS-REFERENCE TO RELATED APPLICATION

This is a continuation-in-part of applicant's application entitled Vibration Detectors, Ser. No. 684,768, filed Nov. 21, 1967, now abandoned.

BACKGROUND OF THE INVENTION

This invention relates generally to vibration-responsive devices and more particularly to vibration sensing or detecting apparatus utilizing means movable in response to vibration for changing the incidence of light on a light-sensitive element.

The need for an accurate and reliable device to detect vibration has become more omnipresent in recent years. The lack of a suitable vibration detecting apparatus having a high degree of accuracy over a relatively wide dynamic range of vibration frequencies and particularly at low vibration frequencies has been recognized by a large number of industries. It has long been recognized that undesirable vibration not only can impair the operating efficiency of mechanical equipment, but often can create damage-producing forces which can completely destroy mechanical and electrical equipment.

In many industrial plants, unattended mechanical equipment such as pumps, cooling towers, and generators sometimes develop an undesirable low frequency vibration after prolonged use. At first, the vibration is so slight that it remains unnoticed. However, when the vibration is sufficient to be noticed or to be detected by commercially available vibration detectors, the mechanical equipment has already sustained a considerable amount of damage.

The problem of detecting vibration is also particularly pronounced in the case of rapidly moving large components on mechanical devices such as on industrial centrifuges. In such centrifuges, vibration often occurs when the centrifuge basket is unevenly loaded and this must be arrested. However, the presently available vibration sensors are not capable of distinguishing between this type of low-frequency vibration and normal higher frequency vibration resulting from centrifuge basket rotation.

There are not presently available inexpensive vibration detectors which are sufficiently sensitive and sufficiently accurate to be used in the above situations for detecting undesirable vibrations of low frequency or of low amplitudes of vibration.

The problem of accurately detecting vibration is exemplified with regard to industrial cooling towers where vibration can be generated as a result of ice build-up on the fan blades, inter alia, and may materially increase mechanical wear and substantially reduce the life of bearings and other components. A commercially available vibration sensor operates on the principle of piezoelectrically-induced voltages. However, vibration of cooling towers or other large devices may be of insufficient magnitude or frequency to develop an induced voltage of sufficient magnitude to be readily measured or detected without high amplification, resulting in the introduction of noise or distortion which produces unreliable results. This type of presently available device therefore fails where the need is most pronounced.

SUMMARY OF THE INVENTION

Among the several objects of the invention may be noted the provision of vibration responsive apparatus; the provision of such apparatus particularly responsive to low frequency vibration; the provision of such apparatus which responds to a preselected magnitude or amplitude of vibration; the provision of such apparatus which is operative to carry out a control function such as giving an advisory signal or protectively deenergizing apparatus at a predetermined magnitude of vibration; the provision of such apparatus wherein the control function may be selectively carried out when the vibration either exceeds or falls below said predetermined magnitude of vibration; the provision of vibration sensing apparatus producing change in electron flow in response to vibration; the provision of such sensing apparatus responsive to very slight vibration; the provision of such responding to vibration to produce change in electron flow without appreciable time lag; the provision of such sensing apparatus including means movable in response to vibration for varying the amount of light received by a light-sensitive device; the provision of such sensing apparatus which is extremely sensitive to low frequency vibration; and the provision of such vibration responsive and vibration sensing apparatuses which are highly reliable and long-lasting and which are relatively simple in construction and inexpensively manufactured. Other objects will be in part apparent and in part pointed out hereinafter.

Briefly, vibration responsive apparatus includes vibration sensing means producing change in electron flow in response to vibration. Circuit means is interconnected with vibration sensing means and produces a first signal in response to changes in said electron flow. The signal is of an amplitude varying according to the magnitude of the vibration. Means is provided for supplying a preselected reference potential. A voltage comparing means, constituted by the combination of a glow discharge device and a photoresistive cell, is interconnected with the circuit means and the means for supplying a reference potential and algebraically compares the magnitude of the pulsating signal and the reference potential and delivers an output signal when the algebraic sum of the magnitude of the pulsating signal and the reference potential crosses a predetermined threshold voltage. Control means is operative in response to the output signal from the voltage comparing means to perform a control function at a preselected magnitude of vibration.

The vibration sensing means includes a light source and a light-sensitive element positioned for receiving light from the light source and producing a change in electron flow therethrough in response to changes in the incidence of light thereon. A movable member is adapted when at rest to provide only limited passage of light to the element and thereby produces a relatively low level of electron flow through the element. The movable member is resiliently supported for oscillating movement in response to vibration. This oscillatory movement causes changes in the incidence of light on the element to an extent dependent upon the magnitude of vibration.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
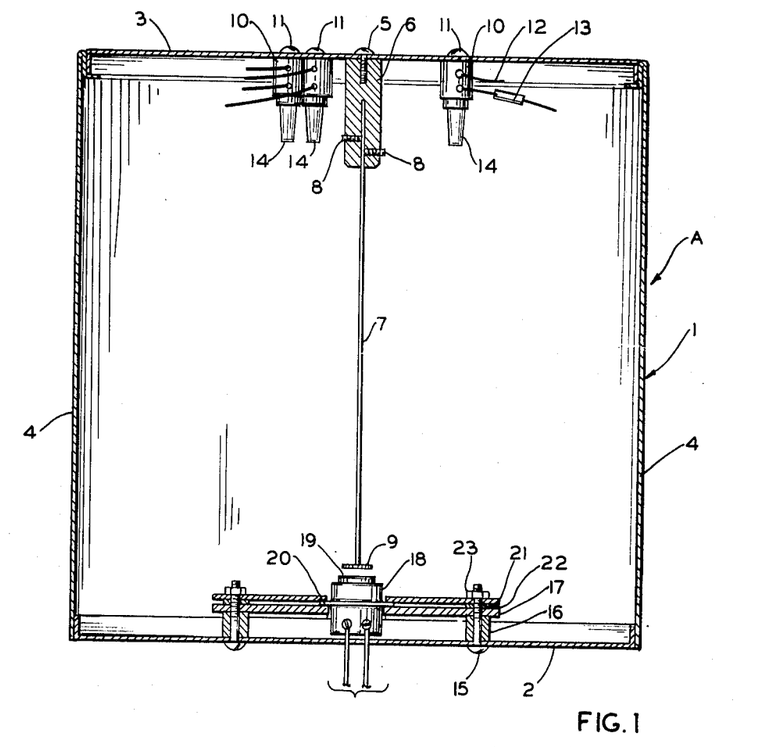
FIG. 1 is a vertical section of vibration sensing apparatus of the present invention.

Referring now to FIG. 1, A generally designates a vibration detector or vibration sensing apparatus of the invention. An outer housing, designated generally 1, includes a bottom wall 2, a top wall 3 and four rectangularly located, endwise abutting side walls 4. The housing 1 is constructed so that one of the side walls 4 is easily removable for convenient access to the interior of the housing. Housing 1 may be made of any suitable plastic or metal.

Secured by means of a screw 5 to the undersurface of top wall 3, somewhat centrally thereof, is a depending socket 6. Socket 6 is internally slotted from its underside and accommodates a relatively long, thin, resilient reed-like element 7, e.g., a length of spring wire. Element or reed 7 is adjustably held in the slotted portion of the socket 6 by means of a pair of diametrally opposed set screws 8. Reed 7 is preferably substantially circular in horizontal cross section. Reed 7 may also be slightly thicker in one dimension than in the other. It is contemplated that other materials, such as those which are flexible, might be used for reed 7.

Reed 7 is freely movable at its lower end. Secured to the lower end of reed 7 in any conventional manner is a light-blocking, i.e., opaque disk 9 which is relatively flat and substantially circular in horizontal cross section. Disk 9 is thus resiliently supported by reed 7 for oscillatory movement in any direction with respect to the longitudinal axis of reed 7, when stationary, in response to vibration of housing 1. Since disk 9 has a substantial weight relative to reed 7, it has a direct effect on the sensitivity of reed 7.

Also mounted on the underside of top wall 3 in close proximity to socket 6 are three circumferentially spaced light sockets 10 which are retained by screws 11. There may be greater or fewer than three light sockets. Each of the sockets 10 is connected to a 150-volt direct current source (not shown) through leads 12. A current limiting resistor 13 is preferably interposed in one of the leads 12 to each of the sockets 10. A light bulb 14 is disposed in each of the sockets 10. Each of bulbs 14 may be a conventional filament incandescent bulb or gas-filled glow discharge device such as a neon bulb. Preferably the bulbs provide a collimated light beam toward disk 9.

Secured to the interior surface of bottom wall 2 by screws 15 are four supporting sleeves 16. The sleeves 16 support a plate 17 which supports a photoresistive cell 18 which has a light sensitive or active surface 19. Photocell 18 has an annular flange 20 secured between plate 17 and a retaining plate 21. Spacers 22 are interposed between plates 21 and 17. Nuts 23 on the ends of the screws 15 secure the assembly.

Active surface 19 of photocell 18 is located in vertical alignment with the reed 7. Disk 9 is preferably, slightly smaller than active surface 19 and slightly spaced from the active surface 19, so that when the reed 7 is in a static position and disk 9 is thus at rest, only the peripheral fringe of active surface 19 is exposed to the light from the bulbs 14. Oscillation of disk 9 in any direction in response to vibration causes changes in the incidence of light from bulbs 14 on surface 19 to an extent dependent upon the magnitude of vibration. The resistance of photocell 18 changes in response to changes in the incidence of light thereon.

One terminal of photocell 18 is connected through a lead 24 (FIG. 2) to a 150-volt direct current source. The other terminal of photocell 18 is connected through a lead 25 to the common junction of a resistor 27 and a coupling capacitor 26 which together form a resistive-capacitive circuit 28. The opposite terminal of the resistor 27 is grounded. Connected respectively to the grounded terminal of the resistor 27 and to the other terminal of the capacitor 26 are a pair of input leads 29 to the amplifier and voltage comparer circuitry of the invention and designated 30. The apparatus 30 is shown interconnected with a relay coil 31 which, when energized, operates contacts 32 connected in a power circuit with a conventional electric motor M.

Figure 2:
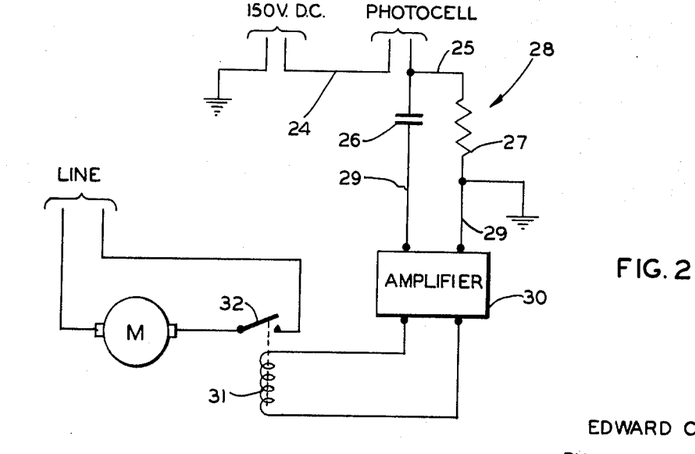
FIG. 2 is a partly block-diagrammatic circuit diagram of vibration responsive apparatus of the invention utilizing the sensing apparatus of FIG. 1.

When the resistance of the photocell 18 changes in response to change in the incidence of light on the photocell resulting from vibration, the resistive-capacitive circuit 28 produces a pulsating signal of an amplitude varying according to the magnitude of the vibration. The apparatus 30 amplifiers this pulsating signal and algebraically compares its amplitude with a preselected reference potential. If the algebraic sum of this amplitude and reference potential exceed or cross a predetermined threshold voltage, an output signal is supplied which, through operation of control circuitry of apparatus 30, causes energization of relay 31 to protectively deenergize motor M. The motor is thus deenergized if vibration exceeds a set point value.

Noting that it is the change in the incidence of light on photocell 18 which generates a pulsating signal varying directly according to the amplitude or magnitude of vibration, it may be seen that housing 1 may be mounted in any position, such as angularly disposed with respect to the vertical, even though the amount of light incidence on the active surface 19 may be greater, because of the weight of disk 9, etc., than if the housing were disposed in a true vertical position.

Figure 3:
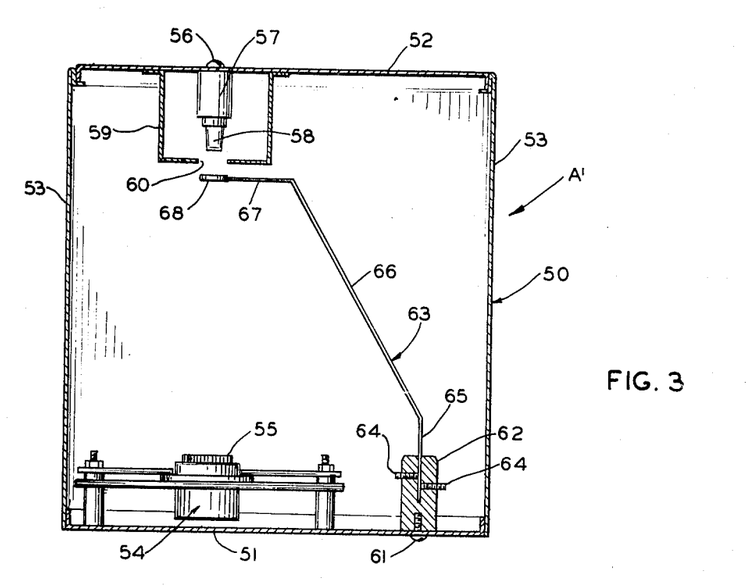
FIG. 3 is a vertical section of a further embodiment of vibration sensing apparatus of the invention.

FIG. 3 illustrates a vibration detector A' which is a further embodiment of vibration sensing apparatus of the invention. It is substantially similar in operation to the FIG. 1 embodiment. An outer housing 50 includes a bottom wall 51, a top wall 52 and four rectangularly located, endwise abutting side walls 53. One of the side walls 53 may be easily removable for providing convenient access to the interior of housing 50.

A photocell 54 having an active surface 55 is mounted on bottom wall 51 and is substantially identical to the previously described photocell 18. Photocell 54 is mounted similarly to photocell 18.

Secured to the interior surface of top wall 52 by means of a screw 56 is a bulb socket 57 in which there is a conventional light bulb 58. Preferably bulb 58 provides a collimated beam of light, and is located in vertical alignment with the active surface 55 of photocell 54. Socket 57 and bulb 58 are located in a compartment 59 attached to the underside of top wall 52. Compartment 59 is preferably removable for providing access to bulb 58 and includes an aperture 60 on its underside so that the light from bulb 58 will be directed on the active surface 55 in a beam which has a cross sectional area substantially equal to that of the active surface 55. A suitable source of power energizes bulb 58.

Secured to the interior surface of bottom wall 51 by a screw 61 is a socket 62 accommodating a relatively long, thin, resilient reed-like element 63. Socket 62 is offset with respect to the axis between the bulb 58 and active surface 55. Element or reed 63 is retained and positioned in socket 62 by a pair of diametrally opposed set screws 64. Reed 63 is preferably a thin round rod, e.g., a length of spring wire, having a substantially circular cross section. Reed 63 includes a vertically disposed stem 65, a main portion 66 which is angled with respect to vertical, and a horizontal portion 67.

A light-blocking, i.e., opaque, disk 68 substantially similar to disk 9 is secured to the free end of reed portion 67 and may have a substantial weight relative to reed 63. Disk 68 is positioned between bulb 58 and active surface 55 when the housing 50 is disposed in a vertical position. Disk 68 is thus resiliently supported by reed 63 for oscillatory movement in response to vibration of housing 50 to cause changes in the incidence of light from bulb 58 on active surface 55 to an extent dependent upon the magnitude of vibration. Photocell 54 is interconnected as in the FIG. 1 embodiment with a resistive-capacitive circuit similar to circuit 28.

Figure 4:
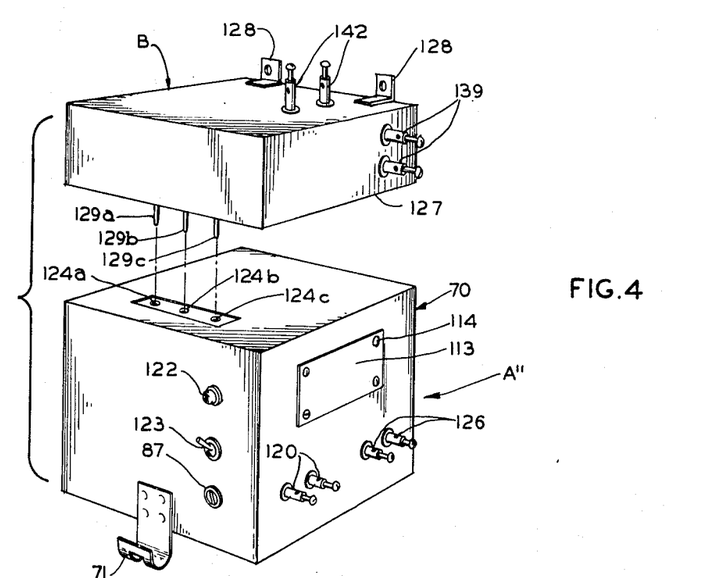
FIG. 4 is an exploded perspective illustrating mechanical interconnection of component parts of vibration responsive apparatus of the invention.

Vibration responsive apparatus of the invention as it appears in perspective is shown in FIG. 4 and is designated A''. As depicted, apparatus A'' includes a vibration sensor as in FIGS. 1 or 3. The apparatus includes a housing 70 provided with a pair of brackets such as shown at 71 for attachment to a structure subject to vibration.

Figure 5:
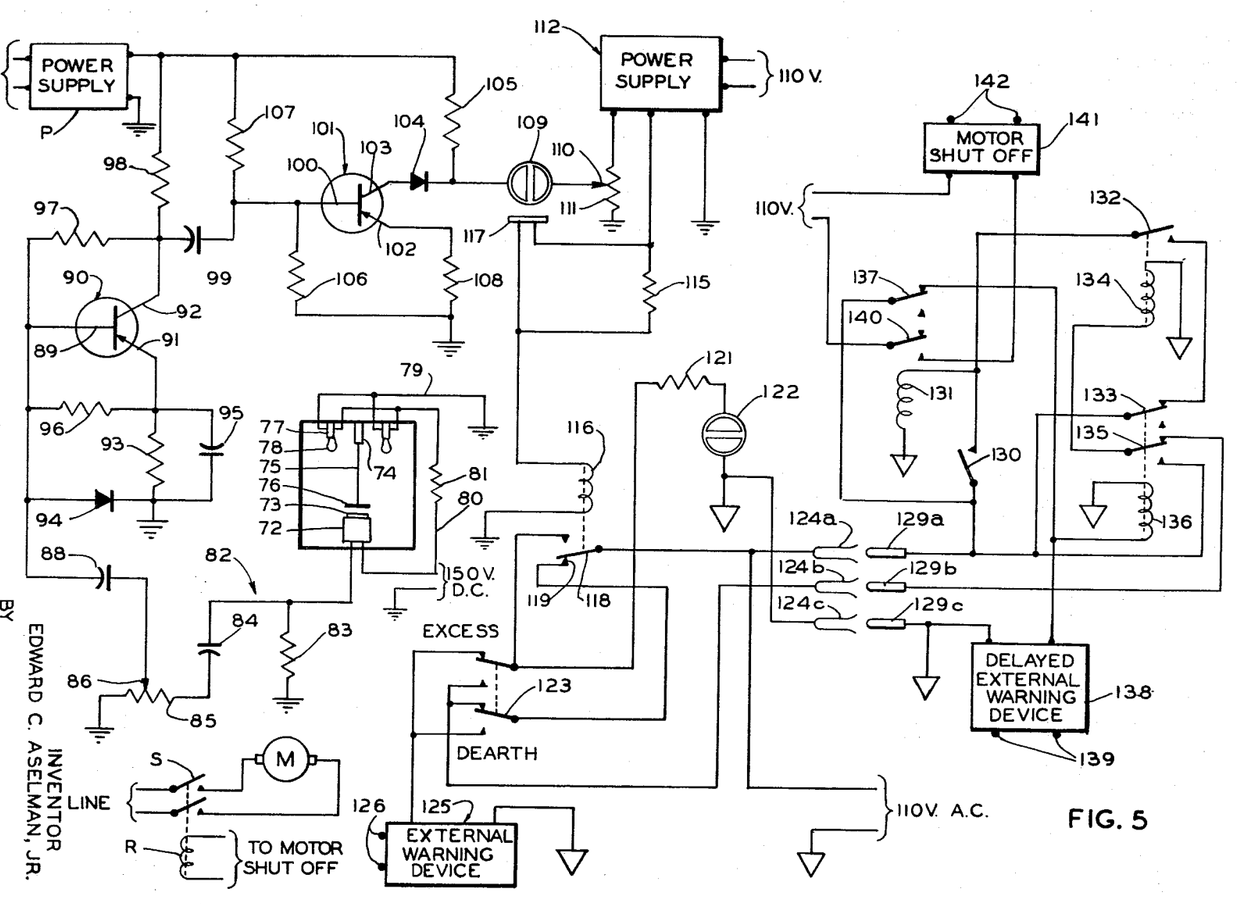
FIG. 5 is a detailed schematic circuit diagram of the present vibration responsive apparatus including vibration sensing apparatus of the invention.

Referring now to FIG. 5, housing 70 includes a photocell 72 mounted interiorly thereof on the bottom wall of the housing and having an active surface 73. Secured to the interior surface of the top wall of the housing 70 is a socket 74 retaining a reed 75. At its lower end, reed 75 supports a light blocking disk 76. Also mounted on the interior top wall of the housing 70 are three circumferentially spaced sockets 77 each holding a light bulb 78.

Each of the light sockets 77 is connected by a grounded lead 79 and a lead 80 including a current-limiting resistor 81 connected to a 150-volt direct current source. One terminal of the photocell 72 is also connected to the same 150 volt direct current source. The other terminal of the photocell 72 is connected to a resistive-capacitive circuit 82 including a resistor 83 and a capacitor 84. One terminal of resistor 83 is connected to ground and the other terminal is connected to one side of capacitor 84. The other side of the latter is connected to a potentiometer 85 whose wiper is positioned for selectively varying the sensitivity of the apparatus to vibration by means of a set screw 87 on the exterior of housing 70 (FIG. 4).

Wiper 86 is connected through a coupling capacitor 88 to the base 89 of a PNP transistor 90. The emitter 91 thereof is biased to ground through an emitter resistor 93. A diode 94 is connected between base 89 and ground for temperature compensation. A bypass capacitor 95 is connected across the emitter resistor 93. Resistors 96, 97, 93 and 98 form a biasing network, for biasing base 89 negative with respect to emitter 91. For this purpose, one end of resistor 98 is connected to the negative output of a D.C. regulated power supply P supplying a voltage of 28 volts, for example. This transistorized network constitutes an amplifying circuit for amplifying the output signal produced by the resistive-capacitive circuit 82.

Collector 92 of transistor 90 is connected through a coupling capacitor 99 to the base 100 of a second PNP transistor 101 whose emitter and collector are designated 102 and 103, respectively. Collector 103 is connected through a diode 104, which provides high voltage protection for transistor 101, and a collector load resistor 105 to the negative terminal of power supply P. Biasing resistors 106 and 107 bias transistor 101, for conduction under no-signal conditions.

The amplified pulsating signal supplied through capacitor 99 from the amplifier circuit which includes the transistor 90 drives transistor 101 between highly conductive and less conductive states to cause the voltage at the cathode of diode 104 to vary between a small pulsating D.C. negative potential and a larger pulsating D.C. negative potential, e.g., from a pulse amplitude of minus two volts to minus fifteen volts.

One electrode of a gas-filled glow discharge device, viz., a neon bulb 109, is connected to the cathode of diode 104 and the other electrode is connected to wiper 110 of a set point potentiometer 111 connected between the positive terminal of a 150-volt D.C. regulated power supply 112 supplying positive 150 volts, for example, and ground. D.C. power supply 112 receives A.C. line voltage by means of terminals 120 (FIG. 4) mounted on the exterior wall of housing 70. Power supply P also preferably receives A.C. power via terminals 120.

Wiper 110 of potentiometer 111 provides a preselected reference potential. The algebraic sum of this potential and the magnitude of the pulsating negative signal at the cathode of diode 104 represents the peak voltage across neon bulb 109. When this peak voltage is sufficient to light the neon bulb 109, which may have a firing voltage of 75 volts, for example, the neon bulb provides a glow discharge. It may be here noted that, in order to avoid any unauthorized tampering with the adjustment thereof, the adjustment screw or knob of potentiometer 111 is preferably accessible only of removing a cover plate 113 (FIG. 4) secured by screws 114.

A photocell 117, which may be a cadmium sulfide type cell, for example, is disposed in light-receiving relationship to neon bulb 109 so as to be illuminated by glow discharge therefrom. The resistance of photocell 117 may drop from approximately 10 megohms to approximately 100 ohms when illuminated by neon bulb 109. One terminal of photocell 117 is connected to power supply 112, and the other terminal is connected to one side of a relay coil 116, the other side of which is grounded. When illuminated, photocell 117 has a sufficiently low resistance to energize coil 116 and operate this relay. A resistor 115 is connected in parallel with photocell 117 to allow some current to flow through relay coil 116 but which is slightly less than that required for operation of the relay. This increases the sensitivity of the photocell 117 by permitting somewhat less change in the resistance thereof to effect operation of the relay.

From the foregoing, it may be seen that neon bulb 109 and photocell 117 together constitute voltage comparing means for algebraically comparing the magnitude of the pulsating signal at the cathode of diode 104 with the reference potential on wiper 110. The photocell delivers an output signal by means of increased current therethrough when the algebraic sum of the pulsating signal magnitude and the reference potential exceed a predetermined threshold voltage at which neon bulb 109 fires.

When energized relay coil 116 closes blade 118 on the upper contact of set of contacts 119. Blade 118 is normally closed on the lower contacts as indicated. The upper contact of set 119 is connected through a current-limiting resistor 121 to one terminal of a neon indicator light 122, the other terminal of which is connected to a floating ground. Neon bulb 122 will be energized when relay coil 116 is energized because of illumination of neon bulb 109. Thus, when lit, bulb 122 indicates that vibration has exceeded a preselected magnitude. Switch blade 118 is connected to the hot side of the A.C. power line and is also connected to a plug receptacle 124a. The normally closed lower contact of set 119 is connected to one blade of a double-pole double-throw selector switch 123. The two center terminals of the double-throw switch 123 are connected to a plug receptacle 124b. The normally open upper contact of set 119 is connected to the other switch blade of switch 123. A third connector plug receptacle 124c is connected to the floating ground. The opposite terminals of the switch 123 are connected to an external warning device terminal strip 125, which also has a terminal connected to the floating ground. Terminal strip 125 provides a pair of terminals 126 on the exterior of housing 70 permitting connection of the external warning device which may be remotely located with respect to the apparatus A''. The external warning device may be a bell or light, et cetera. Switch 123 is selectively operable between an "excess" position for detecting when vibration exceeds the predetermined magnitude determined by the setting of potentiometer wiper 110, and a "dearth" position for detecting when vibration falls below the predetermined magnitude.

It is apparent that the relay operated by energization of coil 116 thereof by means of photocell 117 and the indicator light 122 operated thereby serve as control means operative to perform a control function at a preselected magnitude of vibration such as simply indicating that this magnitude has been reached. Other types of control functions are possible, such as protectively deenergizing motor M shown in FIG. 5 when vibration is excessive. For this purpose, there may be connected to apparatus A'' by means of receptacles 124a–c an automatic disconnect apparatus designated generally B in FIG. 4 and separately enclosed in a housing 127 and whose circuitry is shown in FIG. 5.

Automatic disconnect apparatus B includes a pair of brackets 128 on the exterior surface of housing 127 for attachment to suitable structure. Three pins 129a, 129b and 129c are mounted on the underside of housing 127 and are adapted to plug into receptacles 124a, 124b and 124c, respectively.

Connected to plug 129a is one terminal of a normally-open reset switch 130 whose other terminal is connected to one terminal of the coil 131 of a reset relay. The other terminal of coil 131 is connected to the floating ground. This terminal of switch 130 is interconnected with the normally-open contacts of a time-delay relay whose coil (or heater) is designated 134. The circuit continues from contacts 132 through a normally-closed set of relay contacts 133 thence to plug 129a. Heater coil 134 of the time-delay relay has one terminal connected to the floating ground and the other terminal connected through normally-closed relay contact 135 to plug 129b. Relay contacts 133 and 135 are operated by a relay coil 136. One terminal of coil 136 is connected to the floating ground and the other terminal is connected through normally-closed relay contacts 137 (adapted to be operated by coil 131), thence to pin 129a. When relay coil 136 is energized, contacts 135 of this relay transfer to connect time-delay relay coil 134 to pin 129a.

Connected to the common connection of the contacts 137 and relay coil 136 is one terminal of a terminal strip 138 whose other terminal is connected to plug 129c and also to the floating ground. Terminal strip 138 provides a pair of terminals 139 (See also FIG. 4) permitting connection of an external warning device such as a buzzer or light, et cetera. The circuit to terminals 139 is completed to energize this external warning device when contacts 137 are closed. This warning device may be located at some position remote from the apparatus A''.

Reset relay coil 131 is adapted to operate another set of normally open contacts 140. The contacts are connected in a circuit with the 110-volt A.C. power source to a motor shut off contact strip 141 which is provided with a pair of contacts 142 (See FIG. 4) to which may be connected a relay R (i.e., a motor controller) which operates a main motor switch S.

When plugs 129a, 129b and 129c are inserted in receptacles 124a, 124b and 124c, a circuit is completed from the 110-volt source through normally-closed contacts 137 to actuate relay coil 136. Energization of the coil 136 causes the normally-closed contacts 133 to open and contacts 135 to shift to the lower position. As this occurs, a circuit is completed to time-delay relay coil 134. Energization of coil 134 causes the time-delay contacts 132 to close to complete a circuit therethrough, thence through reset relay coil 131. Energization of the relay coil 131 opens contacts 137 and closes contacts 140. The closing of contacts 140 energizes motor control relay R to energize motor M. Opening of contacts 137 breaks the circuit through coil 136. Deenergization of coil 136 in turn transfers contacts 135 to break the circuit to time-delay relay coil 134. After a time delay, relay contacts on the switch 132 open allowing the relay coil 131 to become deenergized, shutting off the motor M.

However, assuming switch 123 to be in the "excess" position, i.e., for causing deenergization of motor M if there is excessive vibration, a circuit is completed from the A.C. source through blade 118 closed on the lower contact of set 119, through the lower section of switch 123, thence to pin 124b. If vibration does not exceed the magnitude preselected by the setting of potentiometer 110, blade 118 will remain closed on lower contact 119. Thus time-delay relay coil 134 remains energized via contacts 135 as long as vibration remains below this preset magnitude. If vibration momentarily exceeds this magnitude, blade 118 will move off the lower one of contacts 119, breaking the circuit through coil 134. If vibration of this magnitude continues for a period greater than the time delay established by the time-delay relay, motor M is deenergized. Resetting may be accomplished, should this occur, by momentarily actuating switch 130 to reenergize relay coil 131 which in turn causes reenergization of motor control relay coil R.

If switch 123 is placed in the "dearth" position, only when vibration has fallen below the preselected magnitude at which neon bulb 109 extinguishes and has remained so for the time-delay period, will motor M be deenergized.

It is apparent that a suitable warning device connected at terminal strip 138 by terminals 139 will be energized concurrently with deenergization of motor M. Further, a suitable warning device connected at terminal strip 138 by terminals 126 will be energized to signal either excessive vibration or a dearth of vibration (as determined by the setting of switch 123) whenever blade 118 is operated by energization of relay coil 116.

Figures 6, 7, 8, 9A, 9B, 10, 11, 13:
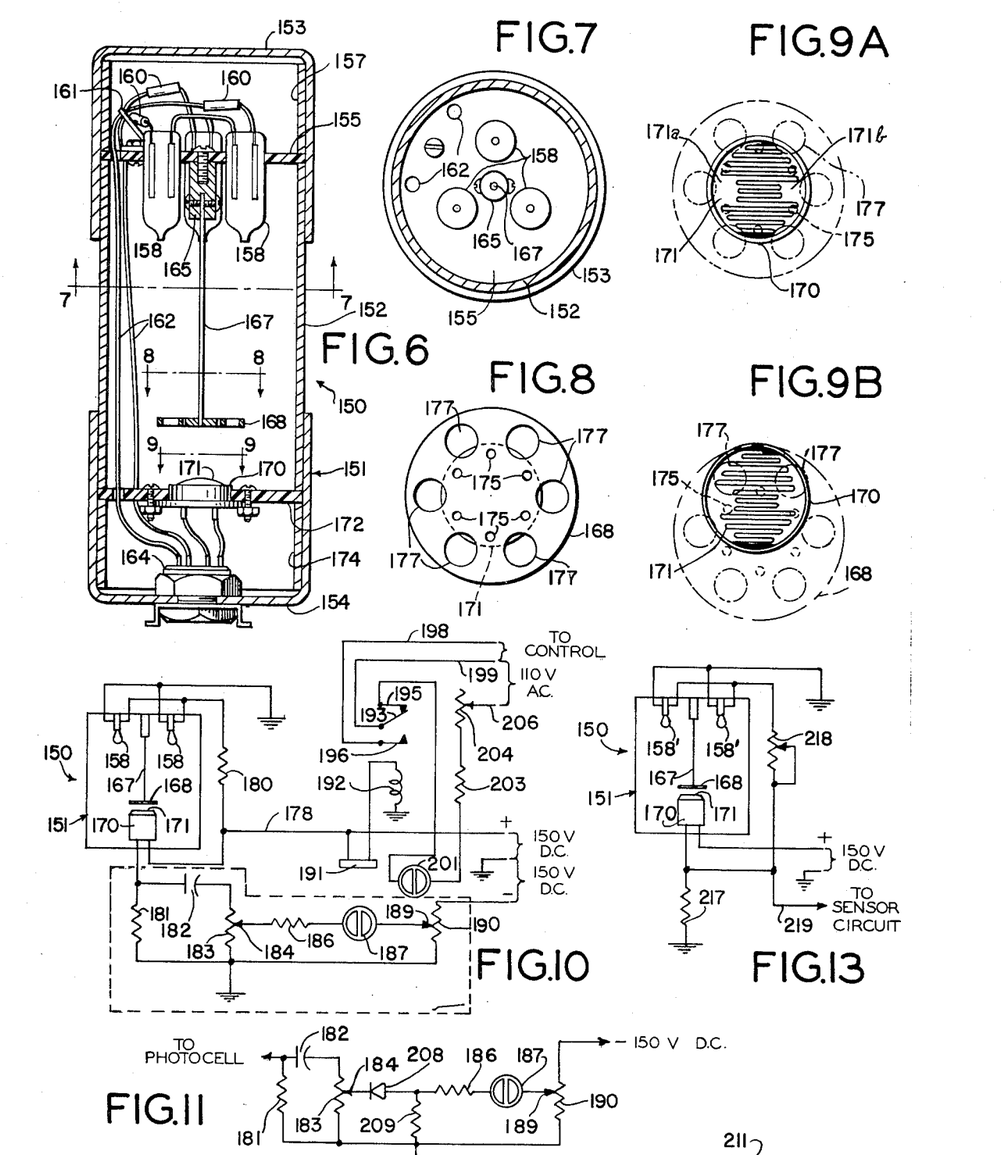
FIG. 6 is a vertical section of improved vibration sensing of the invention.
FIG. 7 is a horizontal section taken on line 7—7 of FIG. 6.
FIG. 8 is another horizontal section, taken on line 8—8 of FIG. 6, and enlarged somewhat.
FIGS. 9A and 9B are sections taken generally on line 9—9 of FIG. 6 and respectively illustrating two positions of a certain movable member of the apparatus.
FIG. 10 is a schematic circuit diagram of simplified, improved vibration responsive apparatus of the invention.
FIG. 11 is a schematic circuit diagram showing a variation of the FIG. 10 circuitry.
FIG. 13 is a schematic circuit diagram illustrating an improved combination of vibration sensing apparatus and circuitry interconnected therewith.

Improved vibration sensing apparatus is illustrated in FIG. 6. The vibration sensor or detector 150 includes a cylindrical enclosure designated generally in its entirely at 151. Enclosure 151, which is substantially light-tight, includes a tubular central portion 152 which is closed at each end by an upper cap 153 and lower cap 154, respectively. Abutting the upper rim of tubular portion 152 is a relatively thin circular member 155, preferably of an electrically insulating material such as a synthetic resin or phenolic material. A tubular spacer member 157 abuts the circular member 155 to provide spacing therebetween and enclosure cap 153, which slidingly fits over spacer 157, member 155, and a portion of tubular portion 152. Circular member 155 has three circumferentially spaced neon bulbs 158 positioned in holes therein and which may be cemented in place. Connected in one of the leads of each of the neon bulbs is a respective current limiting resistor 160, the resistors being connected in common at one end thereof at a lug 161. The respective other leads of the neon bulbs are similarly connected in common. The three neon bulbs are thus connected in parallel and are supplied with power by a single pair of leads 162 connected to respective terminals of a receptacle 164 mounted in lower enclosure cap 154. Extending downward from the center of circular member 155 and secured thereto by a screw is a socket 165 accommodating one end of a relatively long, thin, resilient element 167, here shown to comprise a length of spring wire. The spring wire 167 is retained in socket 165 by a pair of set screws, as illustrated. Carried at the lower end of spring wire 167 is a metal disk 168 secured at substantially the center thereof to spring wire 167 and constituting a movable member which is resiliently supported by the spring wire for oscillatory movement in any direction transverse with respect to the axis of wire 167, when stationary, which axis extends generally between the light source and the light-responsive element, response to vibration of enclosure 151. Positioned just below disk 168 is a photoresistive cell 170 having a light sensitive surface 171 positioned for receiving light from the three neon bulbs 158. As is known to those skilled in the art, photocell 170 when connected with a source of power produces changes in electron flow therethrough in response to changes in the incidence of light on the active surface 171. Photocell 170 is fitted through a hole in the center of a circular member 172 and secured therein by means of screws, as illustrated. Leads from the photocell are also interconnected with receptacle 164. Like member 175, member 172 may be of insulating material, and is fitted against the lower rim or edge of center section 152 of the enclosure. A cylindrical spacer member 174 is positioned against the lower surface of member 172 to space the lower enclosure cap 154 therefrom. Cap 154 is slidably fitted over the members 174, 172 and 152 similarly to cap 153.

In accordance with this invention, disk 168 is adapted when at rest to provide only limited passage of light to photocell 170, thereby producing a relatively low level of electron flow therethrough. For this purpose, disk 168 is provided with series of apertures. As the enlarged FIG. 8 section illustrates, disk 168 has a first series of relatively small apertures 175 positioned at intervals around the center of the disk. The active surface 171 of photocell 170 is shown in dotted outline in FIG. 8, wherein it may be seen that apertures 175 are so positioned as to permit light from bulbs 158 to be incident through apertures 175 upon the active surface. Disk 168 includes a further set of apertures indicated at 177 which are of a size considerably larger than the apertures 175. Apertures 177 are spaced at intervals around the periphery of active surface 171 so that substantially no passage of light is provided through these larger apertures to the active surface 171 when disk 168 is at rest.

The light receiving active surface 171 is shown in FIG. 9A as having areas with different degrees of response to light. In FIG. 9A, the positions of the apertures 175 and 177 of disk 168 are shown in outline. As illustrated, active surface 171 has a pattern defined by individual electrode portions 171a and 171b of active surface 171, there being a serpentine-like area between the electrodes which produces a decrease in resistance between the electrode areas 171a and 171b when light is incident upon this active area. The smaller apertures 175 cause limited change in the incidence of light upon the active surface for any slight oscillatory movement of disk 168 in response to vibration. The additional larger apertures 177 provide increased change in the incidence of light on the active surface of the photocell for increased oscillatory movement of disk 168. Thus, photocell 170 will undergo slight changes in resistance as the smaller apertures 175 sweep across the serpentine-like active areas of the photocell, even for very slight oscillatory movement. A moved position of disk 168 with respect to the photocell is illustrated in FIG. 9B. The movement there is shown as being of such an extent that the larger apertures 177 are seen to have illuminated a considerable area of the active surface of the photocell. Other patterns of the photocell active surface are possible. For example, a spiral pattern may be used. The pattern may be such as to give greater output for vibration along one axis than for another axis.

The above-described construction is highly advantageous in several respects. Since the smaller apertures provide limited passage of light to the active surface of the photocell when the light-blocking disk 168 is at rest, a relatively low level of electron flow will have been established prior to any vibration. Thus when vibration causes movement of the disk, there is no appreciable time lag to produce change in electron flow. Even more significantly, the smaller apertures 175 produce a change in the resistance of the photocell even through movement of the disk by very slight. This is so whether or not the disk be centered with respect to the photocell. If the vibration sensor were tipped or angled with respect to the vertical, the weight of disk 168 (which may, of course, be considerable in comparison with that of spring wire 167) may cause a slight bending of the spring wire so that the individual apertures 175 and 177 are not spaced identically with respect to the center of the active surface of the photocell. The moved position of disk 168 with respect to the photocell as illustrated in FIG. 9B caused by vibration, may also be representative of a condition of the vibration sensor being on its side or angled with respect to vertical to cause off-centering of disk 168. Even though this off-center relationship exists between the photocell and disk 168, any oscillatory movement of the photocell will produce change in incidence of light on the active surface, and the resultant change in resistance in the photocell will be of an extent depending upon the magnitude of vibration. It should be observed that movement of disk 168 is oscillatory, as noted, but that the frequency of the oscillation may be substantially independent of vibration, being determined generally by the weight of the disk and the spring constant and dimensions, etc., of the spring wire. Hence, a sudden shock-like vibration may nonetheless cause oscillation of disk 168.

This vibration sensor embodiment is interconnected by receptacle 164 to circuit means responsive to changing electron flow through the photocell for indicating the magnitude of vibration. In this respect, vibration sensor 150 may be connected in the same manner as shown in FIG. 5, and the circuitry shown therein is operative with sensor 150 as previously explained.

Improved circuitry for use with sensor 150 as well as the previously described embodiments of vibration sensing apparatus is shown in FIG. 10. Sensor 150 is illustrated as interconnected in this circuitry, but the previous sensors may be connected in identical manner.

One terminal of photocell 170 is connected by means of a lead 178 to the positive terminal of a source of D.C. voltage, e.g., 150 volts with respect to ground, as illustrated. Lead 178 also connects this positive D.C. voltage to each of bulbs 158 through a current-limiting resistor 180 for causing illumination of these bulbs. The other terminal of photocell 170 is connected to one side of a resistor 181, whose other side is grounded, which is part of a resistive-capacitive circuit including a capacitor 182 and a potentiometer 183. One terminal of the capacitor is connected to the top of resistor 181 and the other terminal to the top of potentiometer 183, one side of which is grounded. This resistive-capacitive circuit supplies a pulsating signal at the tap or wiper 184 of potentiometer 183 in response to changes in electron flow produced by photocell 170 which are caused by vibration of sensor 150. Thus the magnitude of this pulsating signal varies directly with the magnitude of vibration. Potentiometer 183 permits selective variation in sensitivity of the circuitry and, as will become apparent, thus allows for preselecting the magnitude of vibration at which the control function of the circuitry is performed.

Wiper 184 is connected through a currentlimiting resistor 186 to one terminal or electrode of a neon bulb 187. The other electrode of the latter is connected to the wiper 189 of a potentiometer 190 connected between ground and the negative terminal of a D.C. source, of 150 volts, for example, with respect to ground.

A photocell 191 is disposed in light-receiving relationship to neon bulb 187 so as to be illuminated by glow discharge therefrom. Photocell 191 may be a cadmium sulfide type cell, for example. One terminal thereof is connected to the positive 150 volt d.c. source, as illustrated. The coil 192 of a relay operating a blade 193 is normally closed on an upper contact 195 of the relay and which closes on a lower contact 196 upon energization of coil 193 to complete a circuit through a pair of leads 198 and 199 which may be interconnected, for the purpose of effecting a control function, with an automatic disconnect control of the type previously described or with a motor control or a warning light.

Wiper 189 provides a preselected reference potential. The algebraic sum of this potential and the pulsating signal on wiper 184 represents the peak voltage across neon bulb 187. When peak voltage reaches the firing voltage of the neon bulb, the latter provides a glow discharge illuminating photocell 191 and causing the resistance of the latter to drop greatly, energizing relay coil 192. In effect then, neon bulb 187 and photocell 191 together constitute means for algebraically comparing the magnitude of the pulsating signal on wiper 184 with the reference potential on wiper 189. Photocell 191 in effect delivers an output signal when this algebraic sum crosses the predetermined threshold voltage constituted by the firing potential of the neon bulb.

Positioned adjacent both photocell 191 and neon bulb 187 is a further neon bulb. One terminal thereof is connected to upper relay contact 195 and the other terminal is connected through a resistor 203 and a rheostat 204 with whose tap or wiper is interconnected a lead 206. A source of A.C. voltage, e.g., 110 volts, is supplied across leads 199 and 206 for energizing bulb 201. Rheostat 204 permits adjustment of the intensity of bulb 201, which is energized for illumination so long as blade 193 is closed on contact 195. Bulb 201 provides means for directing a preselected degree of radiation to photocell 191 for stabilizing the response thereof. Photocells, as well as neon bulbs, exhibit a so-called dark history. Prolonged dark exposure alters the response thereof, causing variation in the range of change in resistance of a photocell as between illuminated and dark conditions and variation in the firing level of a neon bulb. Preferably, some light radiation from bulb 201 falls on bulb 187; hence the response of the latter is stabilized as well. Energization of relay coil 192 transfers blade 193 to contact 196, breaking the circuit for neon bulb 201 to prevent interference with the ordinary functioning of photocell 191. It should be noted that light from bulb 201 is insufficient to cause photocell 191 to energize relay coil 192 in the absence of illumination of the photocell by bulb 187.

FIG. 11 illustrates a modification of the circuitry within the area of the dashed line of FIG. 10, showing the provision of a diode 208 having its cathode connected to wiper 184 and its anode connected to resistor 186. A further resistor 209 is connected from the anode of diode 208 to ground. This circuitry provides an advantage in that, should capacitor 182 become "leaky", neon bulb 187 will not thereby be caused to fire, but will instead continue to respond only to vibration thus providing a fail-safe indication.

Figure 12:
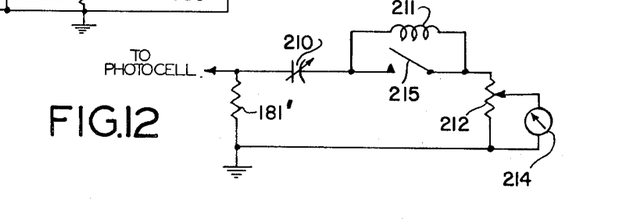
FIG. 12 is a schematic circuit diagram of circuitry useful with vibration sensing apparatus of the invention.

FIG. 12 shows circuitry which may replace that shown within the dashed-line outline in FIG. 10 for measuring frequency. Such circuitry is useful where movable disk 168 of the vibration sensor is flexibly but not resiliently supported, such that movement of the disk is not merely oscillatory as a result of resilient support but instead follows or coincides with the actual vibration frequency. The FIG. 12 circuitry permits measurement of the vibration frequency in this situation.

A resistor 181' is connected between the photocell of the sensor and ground, as previously. A variable capacitor 210 is connected from the top of resistor 181' in series with an inductor 211 and a potentiometer 212, providing a tuned circuit across resistor 181'. A voltmeter 214 is connected between the tap or wiper of the potentiometer 212. Capacitor 210 is adjusted to tune the circuit to resonances as indicated by meter 214, the values of the capacitor and inductor being used, as is well-known, to calculate the frequency. A switch 215 across inductor 211 may be closed if it is desired simply to indicate vibration by means of meter 214, rather than measure its frequency.

Improved vibration sensing apparatus is shown in FIG. 13, wherein the previous sensor 150 is illustrated. The light source therein is provided by bulbs 158' which are of the type providing light of an intensity varying as a function of the energizing potential supplied thereto. Neon bulbs may also be used, though incandescent types are preferable for this purpose.

Photocell 170, as previously, receives light from bulbs 158' and has an electrical resistance decreasing to produce increased electron flow therethrough in response to increase in the intensity of light received thereby. Disk 168 is positioned between the bulbs 158' and photocell 170 and is disposed when at rest to at least partially block light from being received by the photocell from bulbs 158'. Though disk 168 has been previously described as having apertures, such apertures, while highly advantageous, are not necessary in this embodiment. Disk 168 is, in any case, resiliently supported by spring wire 167 for oscillatory movement in response to vibration, so as to cause changes in the incidence of light on the active surface of photocell 170 to an extent dependent upon the magnitude of vibration.

In accordance with the invention, bulbs 158' and photocell 170 are interconnected in a self-servo or bootstrap circuit for causing a concomitant increase in the energizing potential supplied to bulbs 158' with decrease in the resistance of photocell 170 with the result that changes in the photocell's resistance are amplified by changes in the intensity of bulbs 158'.

For this purpose, the positive side of a D.C. power source, of 150 volts, for example, is connected to one terminal of photocell 170. The other terminal of the photocell is connected through a resistor 217 to ground. Thus the photocell is connected in series with resistor 217 across the power source.

A connection is made, from the circuit junction of photocell 170 and resistor 217, through a rheostat 218, to one side of each of bulbs 158'. The other side of each bulb 158' is grounded. Thus the bulbs (in parallel) are connected in series with rheostat 218 across resistor 217. The junction of photocell 170 and resistor 217 is connected via a lead 219 to circuitry, as described in connection with FIG. 5 or as shown in dashed outline in FIG. 10, and which, as previously described, is responsive to changing electron flow through the photocell for indicating the magnitude of vibration as well as performing a desirable control function, et cetera.

This "bootstrap" operation is understood by noting that a movement of disk 168 such as to cause increased incidence of light on photocell 170 will reduce the resistance of the photocell. The reduced resistance will increase the potential at the junction of the photocell and resistor 217. This increased potential will, in turn, cause an increase in the light intensity of bulbs 158'. This has the effect of further decreasing the resistance of the photocell. Hence, the output of the photocell is amplified and sensitivity to vibration increased accordingly.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Vibration-responsive apparatus comprising:
   means for sensing vibration including a light source, a light-sensitive element positioned for receiving light from the light source and producing change in electron flow in response to changes in the incidence of light thereon, and a movable member supported for oscillatory movement in any direction transverse with respect to an axis extending between said light source and said element in response to vibration to cause changes in the incidence of light on the element to an extent dependent upon the magnitude of the vibration;
   circuit means, interconnected with the vibration sensing means, for producing a first signal in response to changes in said electron flow, said signal having an amplitude varying directly according to the magnitude of the vibration;
   means for supplying a preselected reference potential;
   voltage comparing means, interconnected with the circuit means and the means for supplying a reference potential, for algebraically comparing the magnitude of the first signal and the reference potential, and delivering an output signal when the algebraic sum of the magnitude of the first signal and the reference potential crosses a predetermined threshold voltage; and
   control means, operative in response to said output signal from the voltage comparing means, for performing a control function at a preselected magnitude of vibration.

2. Apparatus as set forth in claim 1 wherein the voltage comparing means comprises a gas-filled glow discharge device providing a glow discharge at a voltage thereacross of said predetermined threshold, and a photocell adapted to be illuminated by said glow discharge to deliver said output signal.

3. Apparatus as set forth in claim 2 further comprising means for directing a preselected degree of radiation to the photocell for stabilizing the response thereof.

4. Apparatus as set forth in claim 1 wherein said first signal is a pulsating signal and the circuit means comprises a resistive-capacitive circuit including a capacitance connected to provide said pulsating signal in response to change in direct current electron flow produced by the sensing means.

5. Apparatus as set forth in claim 4 further comprising an amplifier means interconnected with the resistive-capacitive circuit for amplifying the pulsating signal.

6. Apparatus as set forth in claim 4 wherein the resistive-capacitive circuit includes a selectively variable resistance interconnected with the capacitance for preselecting the magnitude of the vibration at which said control function is performed.

7. Apparatus as set forth in claim 1 wherein the control means further comprises time-delay means for causing said control function to be performed only after a predetermined time interval after said algebraic sum crosses said predetermined threshold.

8. Apparatus as set forth in claim 1 wherein
   said movable member is adapted when at rest to provide only limited passage of light to said light-sensitive element and thereby producing a relatively low level of electron flow through said light-sensitive element.

9. Vibration sensing apparatus comprising:
   a light source;
   a light-sensitive element positioned for receiving light from the light source and producing a change in electron flow therethrough in response to changes in the incidence of light thereon;
   a movable member adapted when at rest to provide only limited passage of light to the element and thereby producing a relatively low level of electron flow through the element;
   means for resiliently supporting the movable member for oscillating movement thereof in any direction transverse with respect to an axis extending between said light source and said element in response to vibration, said oscillatory movement causing changes in the incidence of light on the element to an extent dependent upon the magnitude of vibration; and
   circuit means interconnected with the element and responsive to changing electron flow therethrough for indicating the magnitude of the vibration.

10. Apparatus as set forth in claim 9 wherein the movable member has at least one aperture.

11. Apparatus as set forth in claim 9 wherein the light-sensitive element has a light-receiving surface having areas with different degrees of response to light.

12. Apparatus as set forth in claim 11 wherein the light-sensitive element is constituted by a photoresistive cell.

13. Apparatus as set forth in claim 11 wherein the movable member has at least one aperture.

14. Apparatus as set forth in claim 13 wherein the movable member has at least one additional aperture of a size larger than that of the first-said aperture, the first-said aperture providing said limited passage of light to the element and said additional aperture providing substantially no passage of light to the element when the movable member is at rest, the first-said aperture causing limited change in the incidence of light on the element for slight oscillatory movement of the member and the additional aperture providing increased change in the incidence of light on the element for increased oscillatory movement of the member.

15. Apparatus as set forth in claim 9 wherein the means for resiliently supporting the movable member comprises a relatively long, thin, resilient element, the movable member being carried at one end thereof, the other end thereof being secured and subject to vibration.

16. Apparatus as set forth in claim 15 wherein the resilient element comprises a length of spring wire, said axis constituting the longitudinal axis of said spring wire when stationary.

17. Apparatus as set forth in claim 15 wherein the spring wire is angled with respect to vertical.

18. Apparatus as set forth in claim 15 wherein the movable member is a substantially circular opaque disk secured to the resilient element substantially at the center of the disk.

19. Apparatus as set forth in claim 15 wherein the movable member is positioned between the light source and the light-sensitive element.

20. Apparatus as set forth in claim 15 wherein the light source, the light-sensitive element, the movable member, and the resilient element are enclosed in a substantially light-tight enclosure.

21. Vibration sensing apparatus comprising:
an electrically energizable light source providing a light of an intensity varying as a function of the energizing potential supplied thereto;
a light-sensitive element positioned for receiving light from the light source and having an electrical resistance decreasing to produce an increase in electron flow therethrough in response to increase in the intensity of light received thereby;
a movable member disposed when at rest to at least partially block light from being received by the element from the light source;
means for resiliently supporting the member for oscillatory movement thereof in any direction transverse with respect to an axis extending between said light source and said element in response to vibration, said oscillatory movement causing changes in the incidence of light on the element to an extent dependent upon the magnitude of vibration;
first circuit means for connecting the light source and the element to a source of power, including resistance means electrically interconnected with the light source and the element for causing concomitant increase in energizing potential supplied to the light source with decrease in the resistance of the element whereby changes in the resistance of the element upon said oscillatory movement are amplified by changes in the intensity of the light source; and
further circuit means interconnected with the element and responsive to changing electron flow therethrough for indicating the magnitude of the vibration.

22. Apparatus as set forth in claim 21 wherein the first circuit means includes a first resistance connected with the light-sensitive element in a series circuit adapted to be connected across the source of power, and a further resistance connected with the light source in a series circuit across the first resistance.

* * * * *